US006354158B1

(12) United States Patent
Eidem et al.

(10) Patent No.: US 6,354,158 B1
(45) Date of Patent: Mar. 12, 2002

(54) SYSTEM FOR MEASURING TORQUE APPLIED TO THE DRUM SHAFT OF A HOIST

(75) Inventors: Brian L. Eidem, Cerritos; Bruce B. Prior, Yorba Linda; Timothy I. Montgomery, Corona; Tarun Khanna, Fullerton, all of CA (US)

(73) Assignee: Varco International, Inc., Houston, TX (US)

( * ) Notice: Subject to any disclaimer, the term of this patent is extended or adjusted under 35 U.S.C. 154(b) by 0 days.

(21) Appl. No.: 09/563,114

(22) Filed: May 2, 2000

Related U.S. Application Data

(60) Provisional application No. 60/132,143, filed on May 2, 1999.

(51) Int. Cl.[7] .................................................. G01L 5/00

(52) U.S. Cl. .................................. 73/862.56; 73/152.59

(58) Field of Search .......................... 73/862.56, 152.49, 73/152.59; 254/274

(56) References Cited

U.S. PATENT DOCUMENTS

| | | | | | |
|---|---|---|---|---|---|
| 1,859,814 | A | | 5/1932 | Wyckoff | |
| 3,938,381 | A | * | 2/1976 | Rundell et al. | 73/865.56 |
| 4,042,214 | A | | 8/1977 | Brener | 254/186 |
| 4,048,547 | A | | 9/1977 | Havard et al. | 318/488 |
| 4,228,682 | A | * | 10/1980 | Decker et al. | 73/862.56 |
| 4,321,836 | A | * | 3/1982 | Toalson | 73/862.56 |
| 4,350,048 | A | | 9/1982 | Kovács | 73/862.54 |
| 4,434,971 | A | * | 3/1984 | Cordrey | 254/273 |
| 4,493,479 | A | * | 1/1985 | Clark | 254/274 |
| 4,613,800 | A | | 9/1986 | Jeppsson | 318/434 |
| 4,616,321 | A | * | 10/1986 | Chan | 73/151.5 |
| 5,027,024 | A | | 6/1991 | Slayton | 310/90 |
| 6,029,951 | A | * | 2/2000 | Guggari | 254/269 |

FOREIGN PATENT DOCUMENTS

| | | |
|---|---|---|
| DE | 39 21 679 | 1/1991 |
| DE | 196 45 812 | 2/1998 |
| GB | 2 027 405 | 2/1980 |

OTHER PUBLICATIONS

Search Report dated Sep. 12, 2000 relating to corresponding International Application No PCT/US00/11965, 5 pp.

* cited by examiner

*Primary Examiner*—Max Noori
(74) *Attorney, Agent, or Firm*—Christie, Parker & Hale, LLP

(57) ABSTRACT

The invention provides a method and apparatus for measuring the torque applied to the drum shaft of a hoist. By measuring the torque on the drum shaft, the force or tension on the fast line can be accurately determined. If the force or tension on the dead line is also measured, the forces on the fast line and dead line can be used to determine the force applied to the load. One embodiment of the invention uses a transmission coupled to the drum shaft as a moment arm. The transmission is coupled to a fixed point by a strain-sensing element located some distance from the center of the drum shaft. The distance between the center of the drum shaft and the point along the transmission where the strain-sensing element is mounted provides the moment arm for measuring the torque on the drum shaft. Another embodiment of the invention provides "C"-shaped side plates to support and mount the main bearings of the drum shaft. The cutout provided by the "C"-shape of the side plates allows the drum shaft, drum shaft bearings, and drum shaft bearing carriers to be passed from outside the side plates to inside the side plates without the need to remove components from the ends of the drum shaft. With the drum shaft in place, a plate or link installed to span the cutout of each side plate. The plate or link coupled to the side plate on each side of the cutout region.

24 Claims, 10 Drawing Sheets

SYSTEM FOR MEASURING TORQUE APPLIED TO THE DRUM SHAFT OF A HOIST

CROSS-REFERENCE TO RELATED APPLICATION

This application is based on provisional patent application Ser. No. 60/132,143, filed May 2, 1999.

FIELD OF THE INVENTION

The invention relates generally to well drilling equipment and, more specifically, to a hoist or drawworks for well drilling.

BACKGROUND OF THE INVENTION

Well drilling involves the use of many large and heavy items, for example, drill collars, pipe, well casing, etc. To use these items effectively, the items must be lifted and moved. Because of the size and weight of these items a large tower, referred to as a derrick or mast, is erected. A block and tackle arrangement is installed at the top of the tower. Wire rope or cable is reeved or strung through the sheaves or pulleys of the block and tackle arrangement.

The block and tackle arrangement provides a mechanical advantage, allowing a relatively small force to be used to lift relatively heavy objects. However, this mechanical advantage involves a trade-off; the wire rope or cable is pulled a much longer distance than the distance that the load supported by the block and tackle arrangement moves. Also, the block and tackle arrangement introduces additional friction into the system, thereby reducing its efficiency.

Because of the long distance that the wire rope or cable must travel and the great weight involved, a hoist or drawworks is used. The hoist or drawworks has a drum for reeling the wire rope or cable in or out. The drum is mounted on a drum shaft. The drum shaft is coupled to a motor or prime mover through a transmission. The motor and transmission provide the force to rotate the drum and reel in the wire rope or cable.

The force provided by the motor and transmission needs to be sufficient to overcome the weight of the items being lifted, as well as any friction or other inefficiencies in the system. Since the motor and transmission have finite limits on the amount of force they can provide, and the wire rope or cable also has limits on the amount of force they can withstand, it is important to obtain an indication of the actual force present at the load.

Since the load may include a drill string extending a great distance into the well hole, numerous factors may contribute to the amount of force present at the load. When the load is static, the weight to the drill string and the traveling block of the block and tackle arrangement contribute to the force at the load. However, if, for example, the well hole is drilled so as to deviate from vertical, some of the weight of the drill string may be borne by the lower side of the angled region of the well hole. When the load is being raised or lowered, dynamic factors affect the force on the load. For example, friction between the drill string and the drill hole may increase the force needed to raise the load. Friction in the block and tackle arrangement may also increase the force needed to raise the load by effectively preventing some of the force applied by the hoist or drawworks from reaching the actual load.

To prevent damage to the equipment and to accurately control the forces being applied, techniques for measuring force are used. The end of the wire rope or cable opposite the hoist or drawworks as it comes from the block and tackle arrangement is referred to as a dead line. The dead line is anchored by a dead line anchor to a fixed location. The dead line anchor is provided with a force transducer to measure the force or tension on the dead line. However, because of friction in the block and tackle arrangement and energy needed to bend the wire rope or cable as it passes through the block and tackle arrangement, the amount of force or tension measured at the dead line does not, under dynamic conditions, accurately reflect the amount of force on the wire rope or cable leading from the block and tackle arrangement to the hoist or drawworks, which is referred to as the fast line.

The force or tension on the fast line is usually greater than the force or tension on the dead line when the load is being raised and less than the force or tension on the dead line when the load is being lowered. These differences are often approximately plus or minus 15 percent of the actual force on the load. The differences increase exponentially with the number of lines through the block and tackle arrangement or the number of sheaves or pulleys in the block and tackle arrangement.

The force on the load could be determined if the force or tension on both the fast line and the dead line were known. Unfortunately, while the force or tension on the dead line can be easily measured at the dead line anchor, the force or tension on the fast line is difficult to measure because of its motion.

Alternative approaches have been developed to measure the force on the load. Since friction in the block and tackle arrangement can be assumed to be fairly evenly distributed, the force on the crown block or middle line of the block and tackle arrangement can be measured. Since the middle line has the same number of sheaves or pulleys between it and the fast line as it has between it and the dead line, the frictional losses are approximately equally distributed on both sides and effectively cancel out each other. Unfortunately, this technique requires that the force transducer be located in the block and tackle arrangement, which is mounted at the top of the tower. Since the tower may be, for example, 200 feet high, the force transducer is relatively inaccessible, making it difficult to install and maintain. Also, the signals from the force transducer must be delivered down the tower to operators or equipment below. Communication of the signals is difficult to achieve accurately and reliably.

Another alternative approach is to install a pad-type strain gauge at one of the legs of the tower. The pad-type strain gauge senses indicative of force on the tower exerted by force on the load. This technique is difficult to implement because it requires integrating a strain gauge into the base of the tower, which is an immense and massive structure. As a result, installation and maintenance of the strain gauge is difficult.

Thus, a technique is needed to accurately determine the force on a load without the difficulties and disadvantages of the prior art techniques.

SUMMARY OF THE INVENTION

The invention provides a method and apparatus for measuring the torque applied to the drum shaft of a hoist. By measuring the torque on the drum shaft, the force or tension on the fast line can be accurately determined. If the force or tension on the dead line is also measured, the forces on the fast line and dead line can be used to determine the force applied to the load.

One embodiment of the invention uses a transmission coupled to the drum shaft as a moment arm. The transmission is coupled to a fixed point by a strain-sensing element located some distance from the center of the drum shaft. The distance between the center of the drum shaft and the point along the transmission where the strain-sensing element is mounted provides the moment arm for measuring the torque on the drum shaft.

While the invention may be practiced with strain-sensing elements, such as electrical strain gauges, that can operate effectively without any substantial motion, other types of strain-sensing elements, such as hydraulic load cells, can also be used. Any movement of the transmission allowed by the strain-sensing element can be accommodated by a flexible gear tooth coupling between the motor or prime mover and the transmission. One example of such a flexible gear tooth coupling uses gears having spherically curved teeth to accommodate motion between the motor and transmission. Other techniques for accommodating motion between the motor and transmission may also be used. For example, elastomeric motor mounts could be used to mount the motor on its mounting surface.

Another embodiment of the invention provides "C"-shaped side plates to support and mount the main bearings of the drum shaft. The cutout provided by the "C"-shape of the side plates allows the drum shaft, drum shaft bearings, and drum shaft bearing carriers to be passed from outside the side plates to inside the side plates without the need to remove components from the ends of the drum shaft. Once the drum shaft and its bearing components are located within the cutout portions of the "C"-shaped side plates, the bearing carriers are bolted to the side plates so as to locate the drum shaft at the proper location relative to the side plates.

With the drum shaft in place, a plate or link installed to span the cutout of each side plate. The plate or link is coupled to the side plate on each side of the cutout region. For example, a link having an elongated "H"-shape may be used to span the gap of the cutout region. The ends of the link form a clevis-type arrangement, allowing a pin to be inserted through one side of the link, through the side plate, and through the other side of the link. A pin is inserted through each end of the link to couple each end of the link to the side plate on its respective side of the cutout region.

Using a pin, bolt, or other fastener of round cross section to connect the link to the side plate allows the link to pivot away from the cutout in the side plate when one of the fasteners is removed. Thus, the link serves as an easily releasable link to strengthen and stabilize the side plates while allowing easy access to the drum shaft and its bearing components for installation, removal, or maintenance.

DETAILED DESCRIPTION OF THE INVENTION

Figure 1:
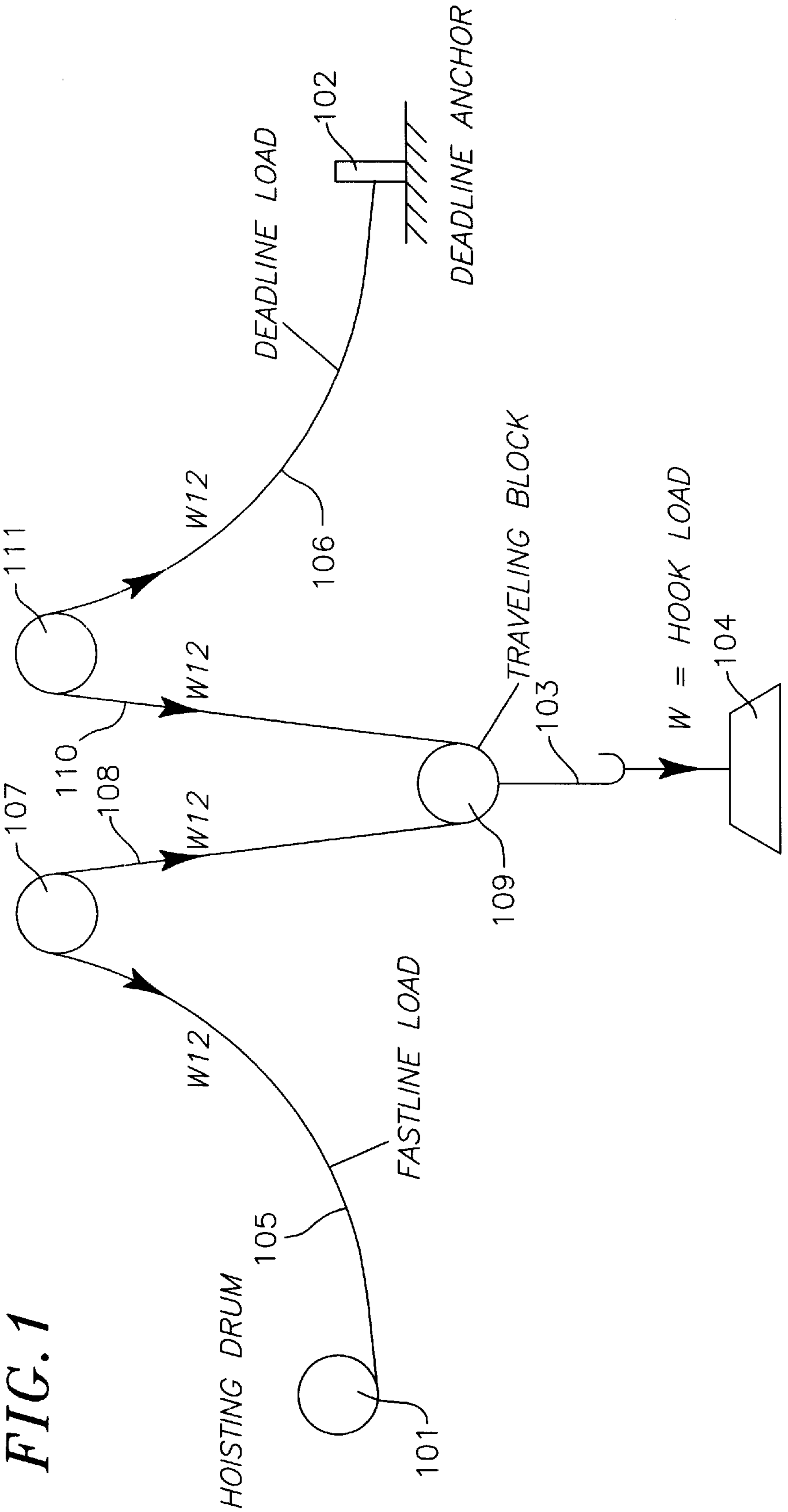
FIG. 1 is a schematic diagram illustrating a hoisting system having a crown block with two pulleys.

FIG. 1 is a schematic diagram illustrating a hoisting system having a crown block with two pulleys. The hoisting system comprises a hoisting drum 101, a hook 103, a deadline anchor 102, a cable, a traveling block, and a crown block. The crown block comprises pulleys 107 and 111. The traveling block comprises pulley 109. The cable passes through the pulleys, resulting in several parts of the cable. The part of the cable between the hoisting drum 101 and the crown block is referred to as the fast line 105. Cable section 108 passes from pulley 107 to pulley 109. Cable section 110 passes from pulley 109 to pulley 111. The part of the cable between pulley 111 and deadline anchor 102 is referred to as the dead line 106. A hook load 104 is supported from hook 103. The hook load is understood to also include the weight of the traveling block as well as the weight actually hanging from hook 103.

The crown block, traveling block, and the cable passing between the crown block and the traveling block constitute a block and tackle arrangement. Although the pulleys of the traveling block are typically coaxial, as are the pulleys of the crown block, the pulleys are more easily understood if depicted separately, as shown in the schematic diagram. The load on the fast line 105 when the hoisting drum 101 is in motion is referred to as the fast line load. The load pulling on the dead line anchor 102 is referred to as the dead line load.

The block and tackle arrangement provides a mechanical advantage, reducing the force required of hoisting drum 101 to lift hook load 104. For example, the force applied to the fast line 105 to lift hook load 104 is approximately equal to the weight of hook load 104 divided by the number of lines strung between the crown block and the traveling block. In the example of FIG. 1, cable sections 108 and 110 are strung between the crown block and the traveling block. Thus, the hoisting drum 101 of FIG. 1 can lift hook load 104 by applying a force approximately equal to half the weight of hook load 104.

Under static conditions, the hook load 104 will be supported by cable sections 108 and 110, each of which will carry half the weight of the hook load 104. The weight of the hook load 104 will also be distributed among fast line 105 and dead line 106 so that half of the weight of hook load 104 will be borne by fast line 105 and half of the weight of hook load 104 will be borne by dead line 106. These relationships can be expressed mathematically. It is understood that force is equal to mass multiplied by acceleration. Thus, $$F=M\times A.$$

Weight refers to force on the mass of an object exerted by acceleration due to gravity. If the weight of hook load 104 is represented using the variable W, the other forces in the system can be expressed in terms of W.

The crown load is the force exerted on the crown block. The static crown load is the force on the crown block when the system is not in motion. The static crown load can be represented as follows:

Static crown load ($SCL$)=fast line load+hook load+dead line load $=W/2+W+W/2=2W$.

Figure 2:
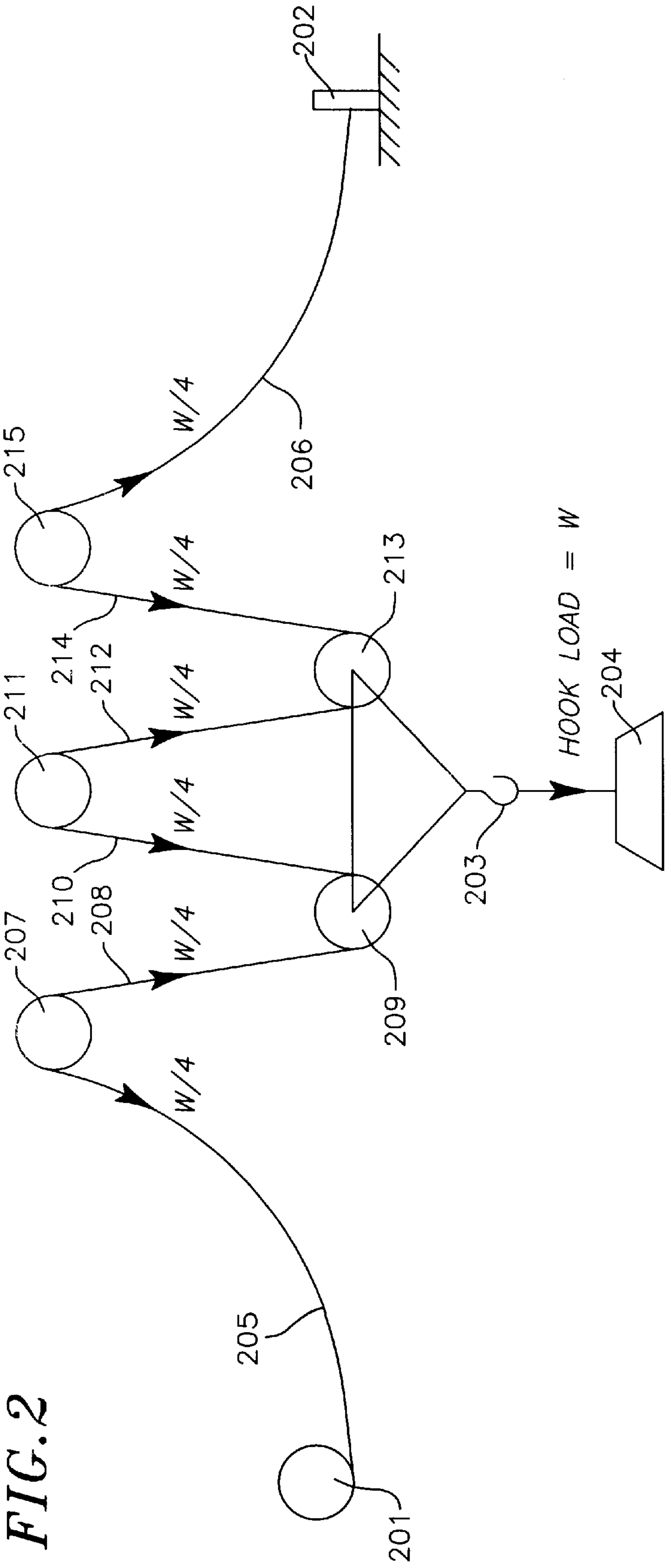
FIG. 2 is a schematic diagram illustrating a hoisting system having a crown block with three pulleys.

FIG. 2 is a schematic diagram illustrating a hoisting system having a crown block having three pulleys. The hoisting system comprises a hoisting drum 201, a hook 203, a deadline anchor 202, a cable, a traveling block, and a crown block. The crown block comprises pulleys 207, 211, and 215. The traveling block comprises pulleys 209 and 213. The cable passes through the pulleys, resulting in several parts of the cable. The part of the cable between the hoisting drum 201 and the crown block is referred to as the fast line 205. Cable section 208 passes from pulley 207 to pulley 209. Cable section 210 passes from pulley 209 to pulley 211. The part of the cable between pulley 211 pulley 213 is cable section 212. The part of the cable between pulley 213 and pulley 215 is cable section 214. The part of the cable between pulley 215 and deadline anchor 202 is referred to as the dead line 206. A hook load 204 is supported from hook 203. The hook load is understood to also include the weight of the traveling block as well as the weight actually hanging from hook 203.

The crown block, traveling block, and the cable passing between the crown block and the traveling block constitute a block and tackle arrangement. Although the pulleys of the traveling block are typically coaxial, as are the pulleys of the crown block, the pulleys are more easily understood if depicted separately, as shown in the schematic diagram. The load on the fast line 205 when the hoisting drum 201 is in motion is referred to as the fast line load. The load pulling on the dead line anchor 202 is referred to as the dead line load.

The block and tackle arrangement provides a mechanical advantage, reducing the force required of hoisting drum 201 to lift hook load 204. For example, the force applied to the fast line 205 to lift hook load 204 is approximately equal to the weight of hook load 204 divided by the number of lines strung between the crown block and the traveling block. In the example of FIG. 2, cable sections 208,210, 212, and 214 are strung between the crown block and the traveling block. Thus, the hoisting drum 201 of FIG. 2 can lift hook load 204 by applying a force approximately equal to one-fourth the weight of hook load 204.

Under static conditions, the hook load 204 will be supported by cable sections 208, 210, 212, and 214, each of which will carry one-fourth the weight of the hook load 204. The weight on cable sections 208 and 214 will also be carried over pulleys 207 and 215 to fast line 205 and dead line 206, respectively, so that one-fourth of the weight of hook load 204 will be borne by fast line 205 and one-fourth of the weight of hook load 204 will be borne by dead line 206.

These relationships can be expressed mathematically. The static crown load can be represented as follows:

Static crown load ($SCL$)=fast line load+hook load+dead line load $=W/4+W+W/4=3/2\times W$ In general, under static conditions, fast line load$=W/N$, and dead line load$=W/N$, where N is the number of lines strung between the traveling block and the crown block. Thus, for N lines, the static crown load is as follows:

$$SCL=W/N+W+W/N=W\,(1+(2/N))=W\,((N+2)/N).$$

Under dynamic conditions, i.e., when the line is moving, the dynamic crown loading is as follows:

dynamic crown load=fast line load+hook load+deadline load, where the fast line load is now magnified as a result of the effects of pulley efficiency due to movement of lines.

In a block-and-tackle system where the cable is strung over a number of pulleys, the line pull exerted by the hoisting drum is gradually reduced toward the deadline due to losses caused by friction in the pulleys and in the bending of the cable around the pulleys. The efficiency of the hoisting system is further reduced by internal friction in the cable and by hole friction (friction in the well hole).

Figure 3:
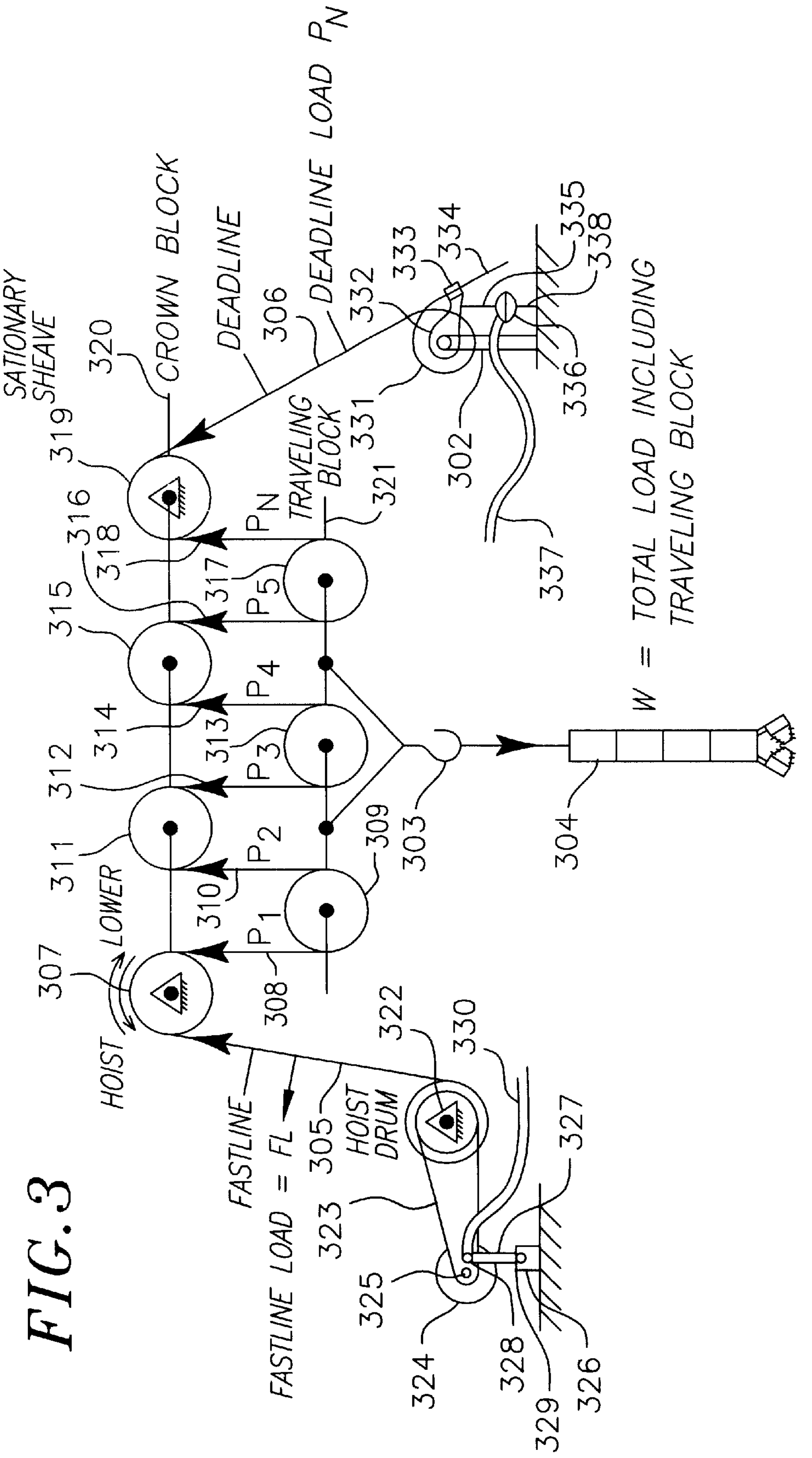
FIG. 3 is a schematic diagram illustrating one embodiment of the present invention.

FIG. 3 is a schematic diagram illustrating one embodiment of the present invention. The system of FIG. 3 comprises hoisting drum 301, deadline anchor 302, hook 303, hook load 304, a crown block, and a traveling block. The crown block comprises pulleys 307, 311, 315, and 319. The pulleys of the crown block are preferably mounted coaxially about axis 320, although the pulleys may be mounted non-coaxially as an alternative. The traveling block comprises pulleys 309, 313, and 317. The pulleys of the traveling block are preferably mounted coaxially about axis 321, although the pulleys may be mounted non-coaxially as an alternative. A block and tackle arrangement comprises the crown block, the traveling block, and a cable. The cable runs from hoist drum 301 to the crown block. The cable then alternates between the crown block and the traveling block, according to the number of pulleys used in the system, with the crown block having one more pulley than the number of pulleys in the traveling block. The cable runs from the crown block to the dead line anchor 302.

The cable can be considered as having a number of sections. The fast line 305 runs from the hoisting drum 301 to the crown block pulley 307. Cable section 308 is between crown block pulley 307 and traveling block pulley 309. Cable section 310 is between traveling block pulley 309 and crown block pulley 311. Cable section 312 is between crown block pulley 311 and traveling block pulley 313. Cable section 314 is between traveling block pulley 313 and crown block pulley 315. Cable section 316 is between crown block pulley 315 and traveling block pulley 317. Cable section 318 is between traveling block pulley 317 and crown block pulley 319. Dead line 306 is between crown block pulley 319 and dead line anchor 302. Dead line anchor comprises cable clamp 333, which securely holds the cable. A free end 334 of the cable extends from the cable clamp 333. The free end 334 may include new cable on a cable spool for future use in the system.

Hoisting drum 301 is part of a hoist that comprises, in addition to hoisting drum 301, transmission 323, motor 324, load link 327, pins 328 and 329, and base 326. Motor 324 provides rotational motion about axis 325. Transmission 323 comprises gears, clutches, and brakes to transfer the rotational motion from motor 324 to hoist drum 301, which rotates about axis 322. The transmission 323 extends away from axis 322 and provides a moment arm.

Either or both of pins 328 and 329 may comprise a strain gauge pin to measure strain resulting from a load on the pin. Any suitable strain gauge pin, for example an electrical or hydraulic strain gauge pin, may be used. In the example of an electrical strain gauge pin, an electrical strain gauge is embedded in or attached to a mechanical part, such as a pin. A line 330 from the strain gauge pin is used to carry the signal from the strain gauge pin to appropriate instrumentation, for example a gauge, a display, a monitor, or a controller.

Torque present on hoist drum 301 is transferred through a shaft at axis 322 to transmission 323. Motor 324 is flexibly coupled to transmission 323 to allow some motion of transmission 323 relative to motor 324. For example, a flexible gear tooth coupling, such as a spherical curved tooth coupling, may be used to couple motor 324 to transmission 323. Alternatively, motor 324 may be flexibly mounted to base 326, for example with elastomeric motor mounts to allow some motion of motor 324 relative to base 326.

Since transmission 323 is coupled to hoist drum 301, torque on hoist drum 301 tends to cause rotational force on transmission 323. Transmission 323 is mounted to base 326 via load link 327 and pins 328 and 329. Pin 328 is attached to transmission 323 at a point some distance D from axis 322. Torque is a force exerted over a distance, determined by multiplying the force times the distance. Mathematically, this relationship is expressed as follows:

$$T=F\times D.$$

Thus, torque exerted on hoist drum 301 results in a force on load link 327 and pins 328 and 329 equal to the torque T divided by the distance D. The force on the strain gauge pin is measured and, given a known distance D, provides a measurement of the torque T on hoist drum 301.

The measurement of torque T on hoist drum 301 is meaningful because it relates to the tension or force on fast line 305. As fast line 305 is wound or unwound, it meets hoist drum 301 tangentially at a radial distance R from the axis 322 of hoist drum 301. Since force is applied to fast line 305 as a result of the influence of motor 324 and hook load 304, the application of the force of the fast line load over the radial distance R produces torque on hoist drum 301. Since the moment arm of transmission 323 and the strain gauge pin used to mount transmission 323 provide a technique for measuring the torque on hoist drum 301, the tension or force on fast line 305 can readily be measured.

As fast line 305 is reeled in and wound around hoist drum 301, fast line 305 is wound spirally across the surface of hoist drum 301 from one end of the drum to the other end, at which point the direction of the spiral reverses and fast line 305 is wound spirally in the opposite direction over the first layer of fast line 305. Since the first layer of fast line 305 is then between the fast line 305 being wound and the surface of hoist drum 301, the radial distance R from the center of the hoist drum 301 increases slightly. If the ratio of the thickness of fast line 305 to the diameter of hoist drum 301 is small enough, the difference in radial distance R may be negligible and may be ignored. However, if the ratio of the thickness of fast line 305 to the diameter of hoist drum 301 is large enough to influence the measurement, the change in radical distance R can be measured and taken into account in the calculation.

For example, an optical beam or a series of optical beams may be used to determine the number of layers of cable on the hoist drum. The optical beams may be oriented across the drum at several different radial distances. As the number of layers of cable on the hoist drum increases, the beams are progressively occluded. For each layer of cable on the hoist drum, the radial distance R can be increased accordingly.

Alternatively, a mechanical sensor or sensors, such as a lever connected to a switch can be used to count the number of layers of cable on the hoist drum. Several levers may be employed to contact the cable at different layers around the hoist drum. Alternatively, an ultrasonic transducer or optical sensor may be used to project an ultrasonic or optical beam radially toward the surface of hoist drum 301 to measure the distance from the transducer or sensor to the hoist drum 301. As cable builds up on hoist drum 301, the distance is reduced and radial distance R is adjusted accordingly. Alternatively, magnetic or proximity sensors may be used to detect the build-up of cable around the hoist drum 301. Alternatively, a roller or other measurement device may be used to measure the movement of fast line 305 as it winds or unwinds from hoist drum 301. By keeping track of the amount of fast line 305, wound on hoist drum 301, the number of layers of cable, and thus the radial distance R, can be determined. To further increase reliability, several of these techniques may be used in conjunction with one another. In one embodiment of the invention, it is preferred to have only three or four layers of cable around hoist drum 301 at any time. Alternatively, embodiments with any number of layers of cable around hoist drum 301 may also be practiced.

Dead line anchor 302 comprises a dead line drum 331, an arm 332, cable clamp 333, linkage 335, load cell 336, and load cell line 337. Dead line anchor 302 provides a measurement of the dead line load by sending a signal through load cell line 337. The signal from dead line anchor 302 can be transmitted to appropriate instrumentation, for example the instrumentation that also receives the signal from line 330. The signals representative of fast line load and dead line load can be processed to provide information regarding the hook load 304 and the efficiency of the block and tackle arrangement.

For hoisting operations, an expression for the efficiency of the block and tackle arrangement can be provided. Let EF=block and tackle efficiency factor K=pulley and line efficiency per pulley N=number of lines strung to traveling block FL=fast line tension DL=dead line tension Starting with a hoisting fast line pull of FL, the friction from the first block pulley reduces the line pull in the first traveling line from FL to $P_1$, where $P_1$ is given by the following expression:

$$P_1=FL\times K.$$

Similarly, the line pull in the second traveling line will be reduced to $P_2$, where $P_2$ is given by the following expression:

$$P_2=P_1\times K$$

or $$P_2=FL\times K^2$$

Similarly, $$P_N=FL\times K^N$$

If N is the number of lines supporting the hook load W, then $$W = P_1 + P_2 + P_3 + \ldots + P_N$$
$$= FL\times K + FL\times K^2 + FL\times K^3 + \ldots + FL\times K^N$$
$$= FL(K + K^2 + K^3 + \ldots + K^N)$$

The terms in brackets form a geometric series, the sum of which is given by $$(K(1-K^N)/(1-K)$$

Hence $$W=(FL\times K(1-K^N))/(1-K)$$

or $$FL=(W(1-K))/(K(1-K^N)$$

In the absence of friction, $$FL=P_1=P_2= \ldots =P_N$$

and hook load W is given by $$W=P_{AV}\times N$$

or $$P_{AV}=W/N$$

where $P_{AV}$=average line pull on block and tackle arrangement. Hence the efficiency factor (EF) of the hoisting system is the ratio of $P_{AV}$ to FL, i.e., $$EF=P_{AV}/FL$$

$$EF=(K(1-K^N))/(N(1\times K))$$

The efficiency factor and fast line load during lowering can be expressed as follows:

$$(EF)_{Lowering}=(NK^N(1-K))/(1-K^N)$$

$$(FL)_{Lowering}=(WK^{-N}(1-K))/(1-K^N)$$

The hook load HL is given by $HL=W$=weight of drill string (or casing) in mud+weight of traveling block, hook, etc.

The hook load is supported by N lines, and, in the absence of friction, the fast line load FL is given by $FL$=hook load/number of lines supporting the hook load=$HL/N$ Owing to friction, the fast line load required to hoist the hook load is increased by a factor equal to the efficiency factor. Thus, $$FL=HL/(N\times EF)$$

Under static conditions, the dead line load is given by HL/N. During motion, the effects of pulley friction must be considered and the dead line load is given by $$DL=(HL\times K^N)/(N\times EF).$$

Because of the non-ideal efficiency of a practical block and tackle arrangement, the fast line load and the dead line load deviate from the values they would otherwise have in an ideal system. The fast line load is often higher than it would be in an ideal system, and the dead line load is often lower than it would be in an ideal system. By processing signals from line 330 and load cell line 337, accurate values for various parameters can be obtained. For example, the actual hook load can be determined. Changes in tension during acceleration or deceleration of the load can be measured even if the changes in tension are of short duration or a transient nature. The invention may also be used to measure the real torque on the brake, which can be used to assess the condition of the machine. For example, changes in real torque over time may be used to determine the amount of wear on the brake. This measurement can be used to signal a warning when the brakes reach a given level of wear. Other conditions, such as anomalies in the bearings, clutch, or motor can also be detected and warning or other indication given.

Figure 4:
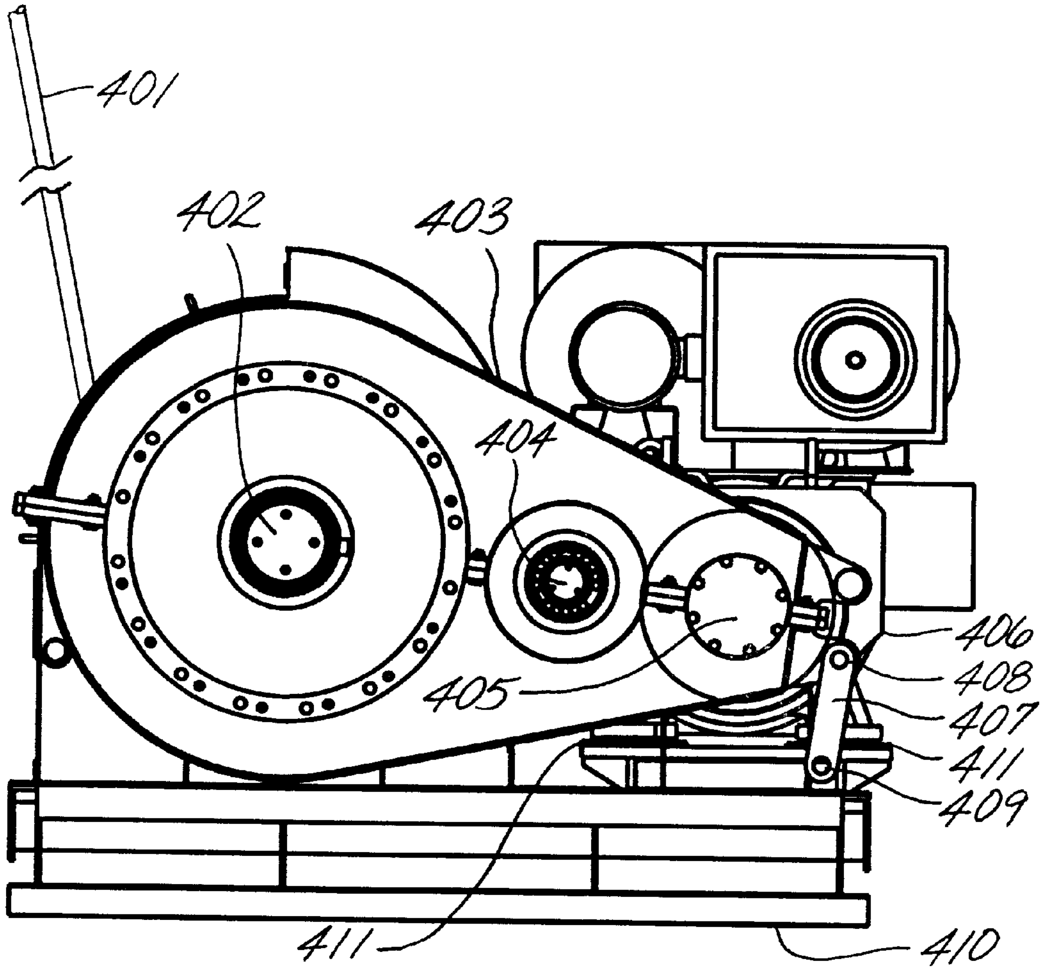
FIG. 4 is a diagram illustrating an elevational view of one embodiment of the invention.

FIG. 4 is a diagram illustrating an elevational view of one embodiment of the invention. The embodiment of FIG. 4 comprises a cable 401, which wraps around a hoist drum having an axis 402. The hoist drum rotates about a drum shaft, which also rotates about axis 402. The drum shaft is coupled to transmission 403. Transmission 403 comprises gears, a clutch, and a brake. The clutch is mounted coaxially with axis 404. The brake is mounted coaxially with axis 402. Other brake and clutch configurations relative to transmission 403 may also be used. Transmission 403 is coupled to motor 406 using a flexible coupling technique along axis 405. Elastomeric motor mounts 411 may also be used to provide a flexible relationship. The gears of transmission 403 transfer rotational motion from motor 406 to the hoisting drum, which provides linear motion to cable 401. The linear motion of cable 401 allows cable 401 to be wound on or unwound from the hoisting drum.

Since transmission 403 is coupled to the drum shaft, but is only flexibly coupled to base 410 through motor 406, torque on the hoist drum induces a corresponding rotational force on transmission 403. Although the housing of transmission 403 need not be coupled to the drum shaft, friction in the gears, brake, and clutch of the transmission, as well as torque from motor 406 result in rotational force being applied to the housing of transmission 403. To keep transmission 403 from moving excessively about axis 402, load link 407 and pins 408 and 409 couple transmission 403 to base 410. Either of pins 408 and 409 may be provided with a strain gauge pin to measure the force exerted on load link 407 by the torque about axis 402.

Figure 5:
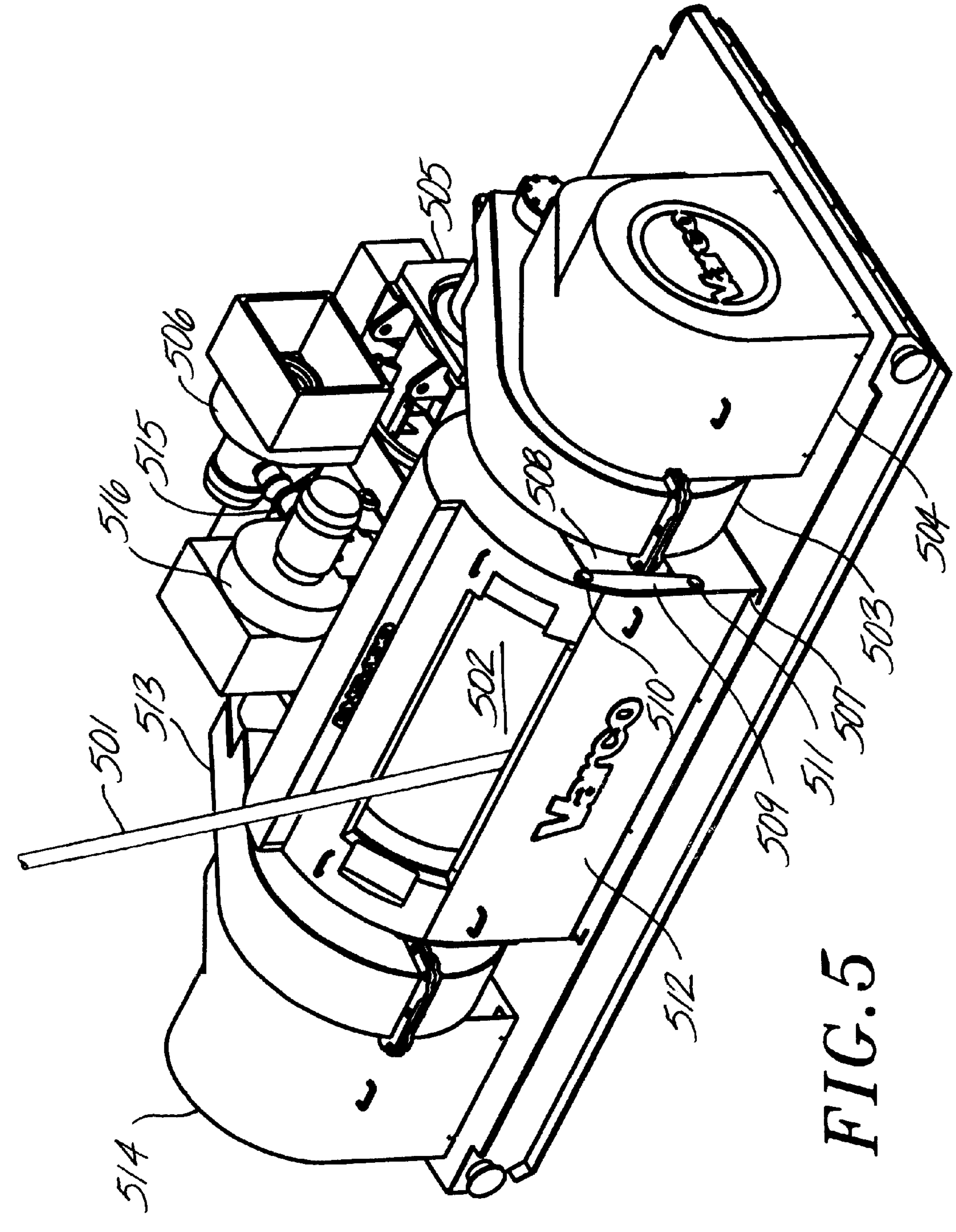
FIG. 5 is a diagram illustrating a perspective view of one embodiment of the invention.

FIG. 5 is a diagram illustrating a perspective view of one embodiment of the invention. The embodiment of FIG. 5 comprises fast line 501, hoist drum 502, transmission 503, brake and clutch housing 504, motor 505, blower 506, end plate 507, end plate link 509, pins 510 and 511, front panel 512, transmission 513, brake and clutch housing 514, motor 515, and blower 516. End plate 507 defines gap 508. End plate link 509 spans gap 508. Pins 510 and 511 mount end plate link 509 to end plate 507.

To provide increased torque, power, and versatility, the embodiment illustrated in FIG. 5 provides two motors to rotate hoist drum 502. Blowers 506 and 516 provide forced-air cooling of motors 505 and 515, respectively. Other motor cooling techniques may also be used. Motors 505 and 515 provide rotational motion through transmissions 503 and 513, respectively, to hoist drum 502. Hoist drum 502 converts the rotational motion to linear motion of fast line 501.

Brake and clutch housing 504 covers and protects the brake and clutch assemblies coupled to transmissions 503 and 513, respectively. End plate 507 and the corresponding end plate on the opposite side of hoist drum 502 support the drum shaft upon which hoist drum 502 rotates. Front cover 512 covers and protects hoist drum 502 and the portion of fast line 501 wound around hoist drum 502.

Figure 6:
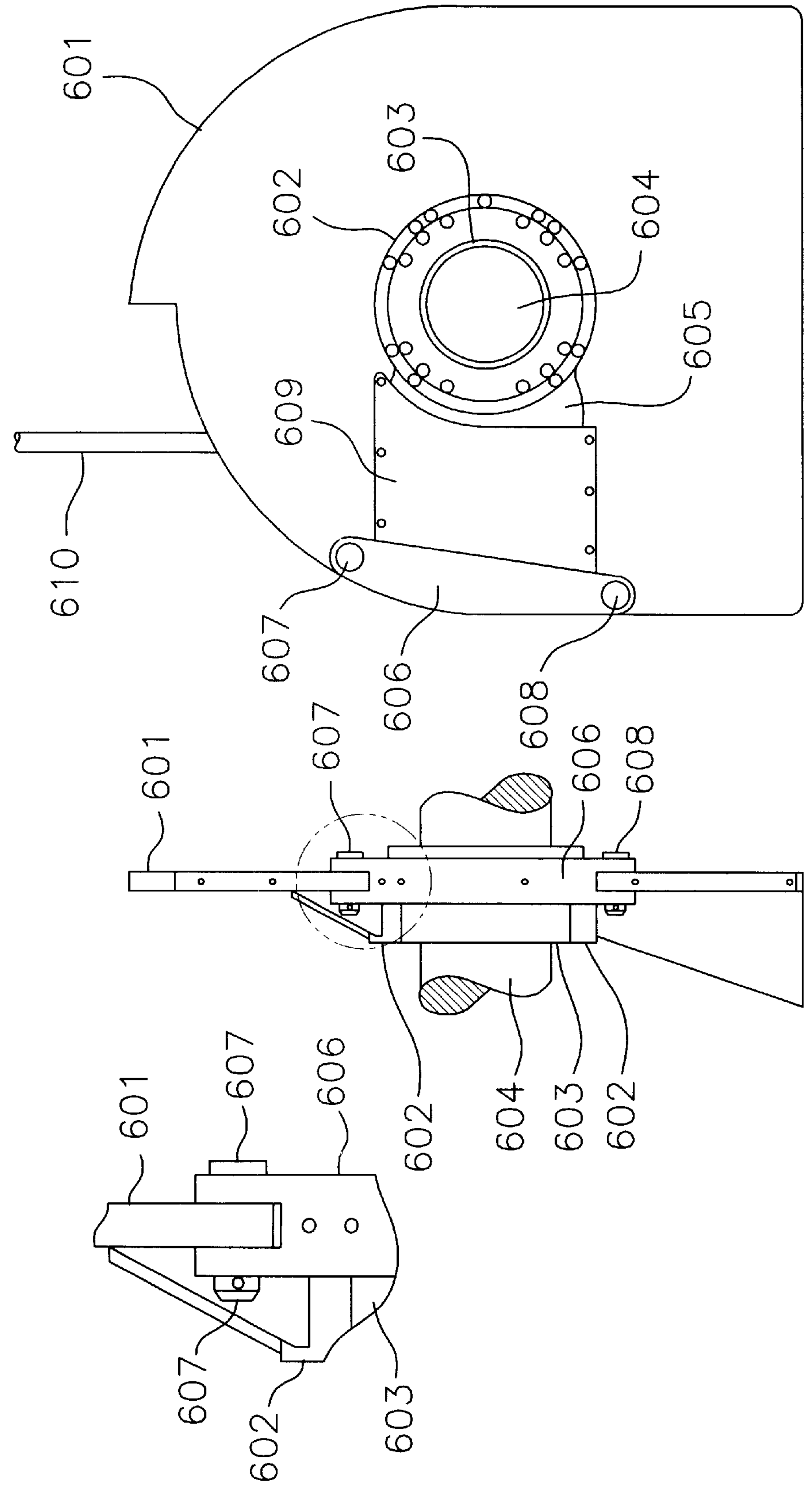
FIG. 6 is a diagram illustrating a detailed front elevational view, a front elevational view, and a side elevational view of one embodiment of the invention.

FIG. 6 is a diagram illustrating a detailed front elevational view, a front elevational view, and a side elevational view of one embodiment of the invention. The embodiment of FIG. 6 comprises end plate 601, bearing carrier 602, bearing 603, drum shaft 604, end plate link 606, pins 607 and 608, and cover 609. End plate 601 defines gap 605, which extends from the region in which bearing carrier 602 is mounted to the edge of end plate 601. End plate link 606 spans gap 605. Cover 609 covers and protects gap 605.

Gap 605 is wide enough to allow bearing carrier 602 to pass through gap 605. Thus, mounting of drum shaft 604 and its bearings is greatly simplified. To mount drum shaft 604 in end plate 601, either of pins 607 and 608 is removed, allowing end plate link 606 to swing out of gap 605. Alternatively both pins 607 and 608 may be removed, allowing end plate link 606 to be removed entirely. Cover 609 is removed.

Bearings 603 and bearing carrier 602 are mounted around drum shaft 604. Shaft 604 with bearings 603 and bearing carrier 602 is moved from a position outside of end plate 601, through; gap 605, to the desired location within end plate 601. Bearing carrier 602 is connected to end plate 601, for example with mounting bolts. Cover 609 is installed and end plate link 606 is installed using pins 607 and 608.

End plate link 606 bears tensile forces exerted on end plate 601 by fast line 610. For example, weight on the hook results in a hook load that also loads the fast line 610. The tension on the fast line 610 exerts an upward force on drum shaft 604, which pushes upward on the upper portion of end plate 601. The upward force on the upper portion of end plate 601 would tend to spread gap 605. However, end plate link 606 and pins 607 and 608 resist the force, reducing the stress on end plate 601 and maintaining dimensional stability of end plate 601.

One embodiment of end plate link 606 is such that end plate link has an elongated "H" shape. The ends of the "H" form a clevis structure that supports pins 607 and 608 on both sides of end plate 601, thereby greatly reducing the shear stresses on pins 607 and 608. Other configurations of end plate link 606 may also be used.

Figure 7:
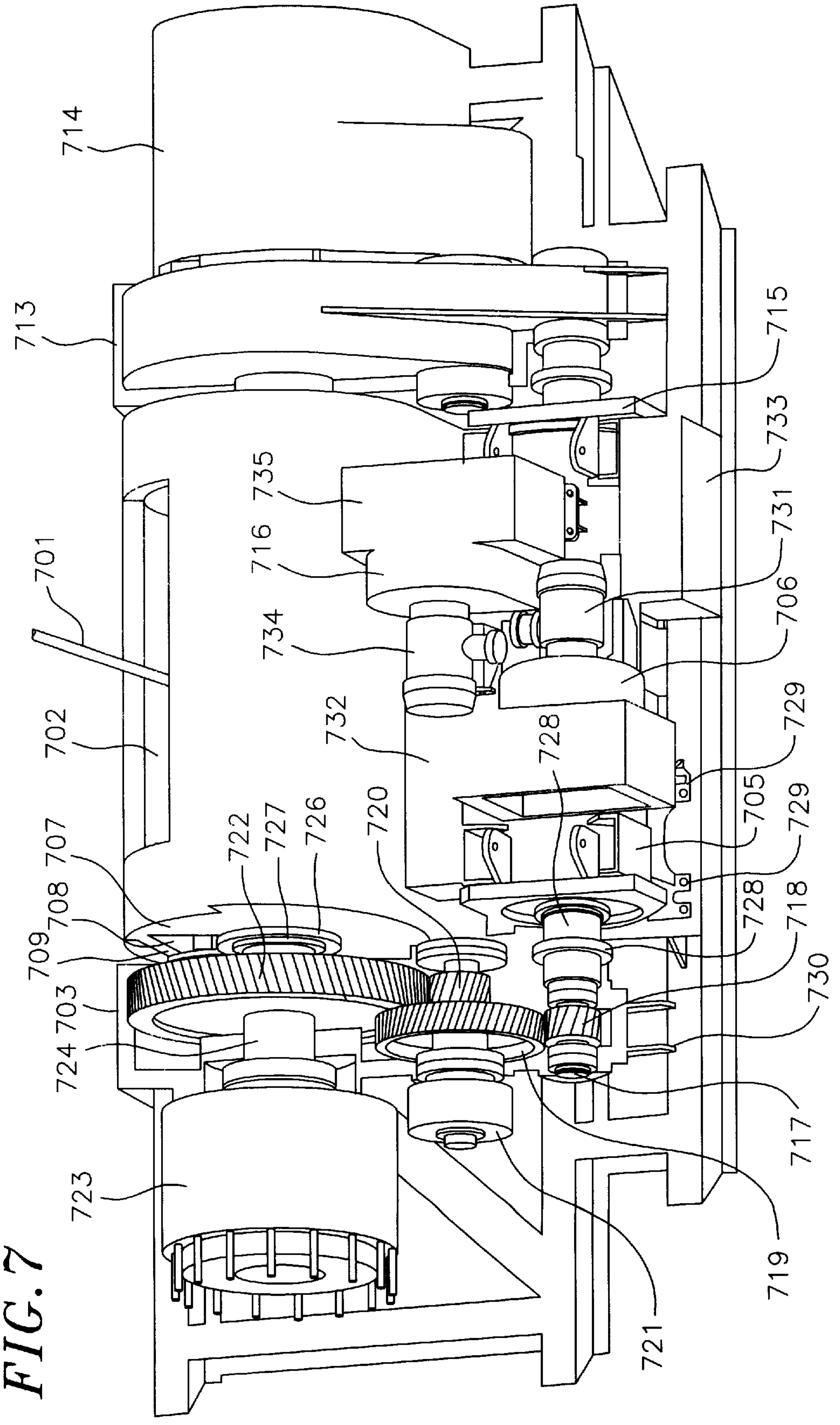
FIG. 7 is a diagram illustrating a perspective view of one embodiment of the invention.

FIG. 7 is a diagram illustrating a perspective view of one embodiment of the invention. The embodiment of FIG. 7 comprises fast line 701, hoist drum 702, transmission 703, motor 705, blower 706, end plate 707, end plate link 709, transmission 713, brake and clutch housing 714, motor 715, blower 716, motor shaft 717, motor gear 718, primary clutch gear 719, secondary clutch gear 720, clutch 721, drum shaft gear 722, brake 723, drum shaft 724, bearing carrier 726, bearing 727, flexible coupling shaft 728, motor mounts 729, load link 730, blower motor 731 blower filter 732, electrical junction box 733, blower motor 734, and blower filter 735. End plate 707 defines gap 708.

This embodiment provides two motors (motors 705 and 715) to provide rotational motion. The rotational motion is coupled through transmissions 703 and 713 to drum shaft 724. Rotation of drum shaft 724 provides rotation of drum 702, which reels in or reels out fast line 701. While the motors 705 and 715 are used to reel in fast line 701, fast line 701 may be reeled out without the use of motors 705 and 715. The influence of gravity on the hook load may be used as the urgent force to reel out fast line 701. Alternatively, motors 705 and 715 may assist in the reeling out process.

Motors 705 and 715 are cooled by blowers 706 and 716, respectively. Blowers 706 and 716 are powered by motors 731 and 734, respectively. The air provided to blowers 706 and 716 is filtered by air filters 732 and 735, respectively. Electrical power is provided to motors 731 and 734, as well as motors 705 and 715 through electrical junction box 733. Motor 705 is mounted on motor mounts 729. Flexible shaft coupling may flex to allow some rotation of transmission 703 about drum shaft 724. Motor gear 718 and primary clutch gear 719 may be provided with teeth that are cut to accommodate motion of motor shaft 717 relative to the axis of primary clutch gear 719, allowing some rotation of transmission 703 about drum shaft 724. Depending on the type of strain gauge used with load link 730, transmission 703 may rotate somewhat under the influence of torque on drum shaft 724. Preferably, strain gauges that allow measurement of force on load link 730 with no or little motion of transmission 703 are used.

Clutch 721 employs dual coaxial shafts to provide separate shafts for primary clutch gear 719 and secondary clutch gear 720. Clutch 721 is preferably an alternating plate disc clutch.

Brake 723 is preferably an alternating plate disc brake assembly operated by air or spring pressure. Brake 723 may be provided with water cooling or other cooling techniques.

Figure 8:
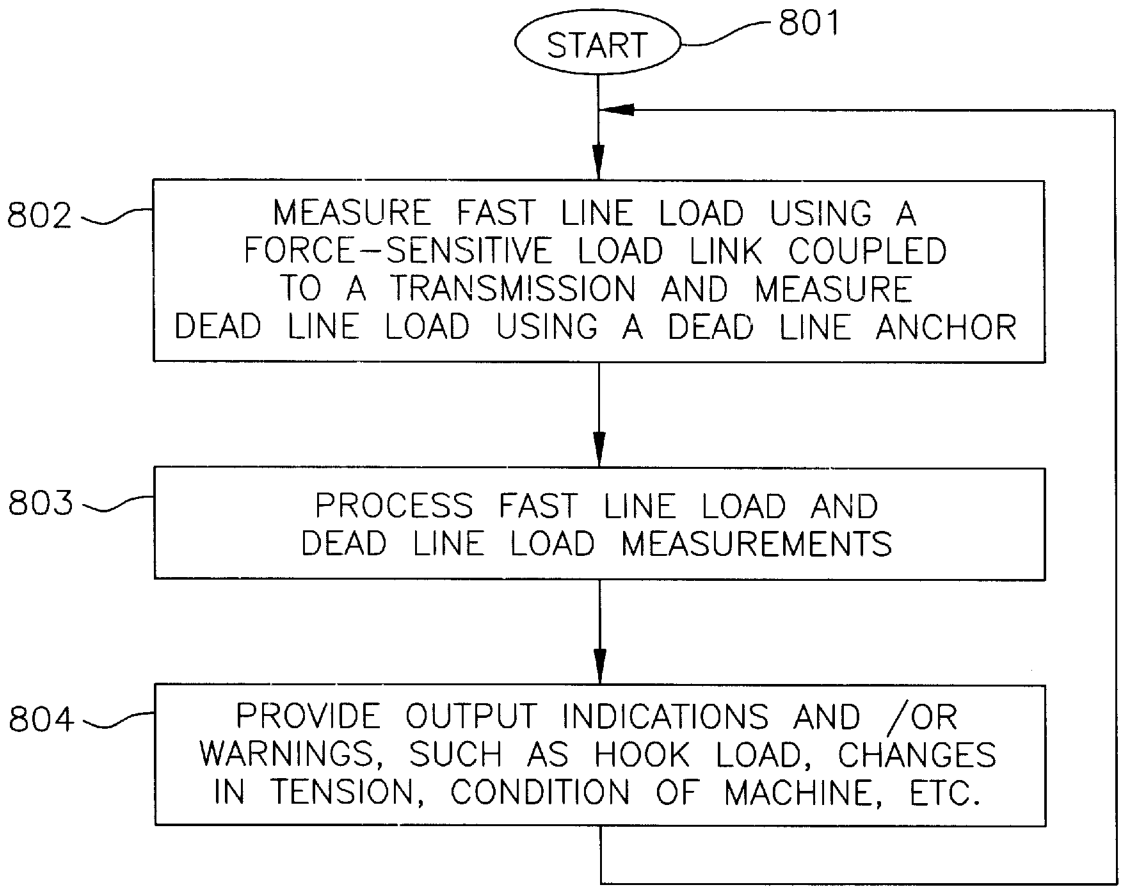
FIG. 8 is a flow diagram illustrating a process according to one embodiment of the invention.

FIG. 8 is a flow diagram illustrating a process according to one embodiment of the invention. The process begins in step 801. In step 802, the fast line load is measured using a force-sensitive load link coupled to a transmission, and the dead line load is measured using a dead line anchor. In step 803, the fast line load and dead line load measurements are processed. Differences between the fast line load and dead line load may be used to calculate the hook load. Fluctuations in the fast line load and dead line load may be analyzed. For example, changes in hook load resulting from changes in downhill pressure may be observed, providing indication of well kicks and other factors affecting the condition of a well. Long term variations in fast line load and dead line load may be stored and analyzed to determine changes in the condition of the machine. These change in the condition of the machine may be used to schedule events, such as replacement of brakes, clutches, slipping the cable to replace worn cable, lubricating the pulleys and other mechanical components, etc.

In step 804, output indications and/or warnings are provided. These include indications and warnings of hook load, changes in tension, condition of the machine, etc. These indications may be stored for later use and comparison or may be presented immediately. Warnings may be set to trigger at certain levels of certain parameters or when certain combinations of parameter values or ranges occur. After step 804, the process returns to step 802.

Figure 9:
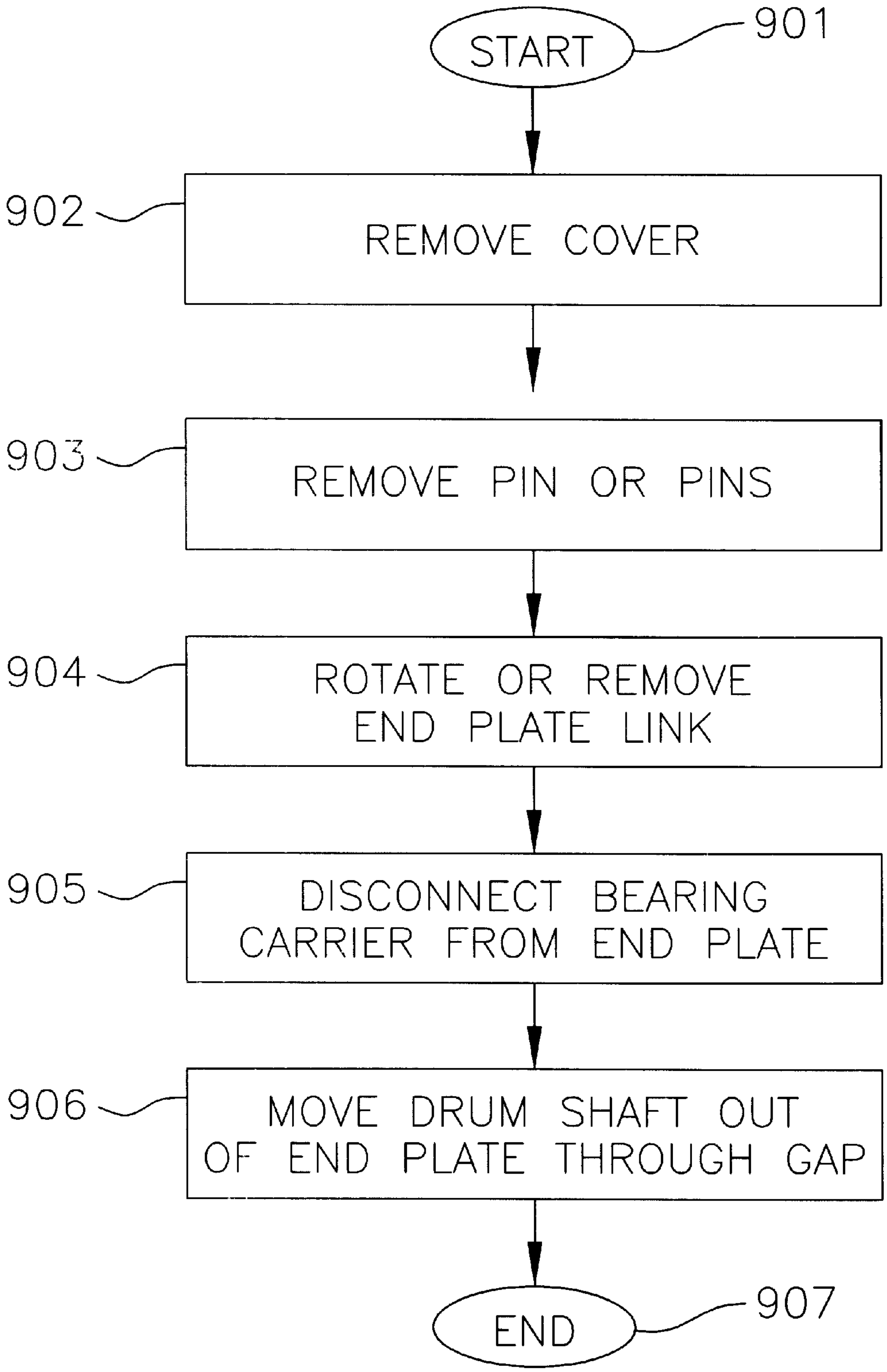
FIG. 9 is a flow diagram illustrating a process according to the invention for removing a drum shaft from an end plate.

FIG. 9 is a flow diagram illustrating a process according to the invention for removing a drum shaft from an end plate. The process begins in step 901. In step 902, the cover is removed. Included in this step is the removal of any covers or panels that block removal of the drum shaft. In step 903, one or more pins in the end plate link are removed. In step, 904, the end plate link is rotated about one of its pins, or, if all pins have been removed, the end plate link is removed. In step 905, the bearing carrier is disconnected from the end plate. This may, for example, involve unbolting the bearing carrier from the end plate. In step 906, the drum shaft is moved out of the end plate through the gap in the end plate. In step 907, the process ends.

Figure 10:
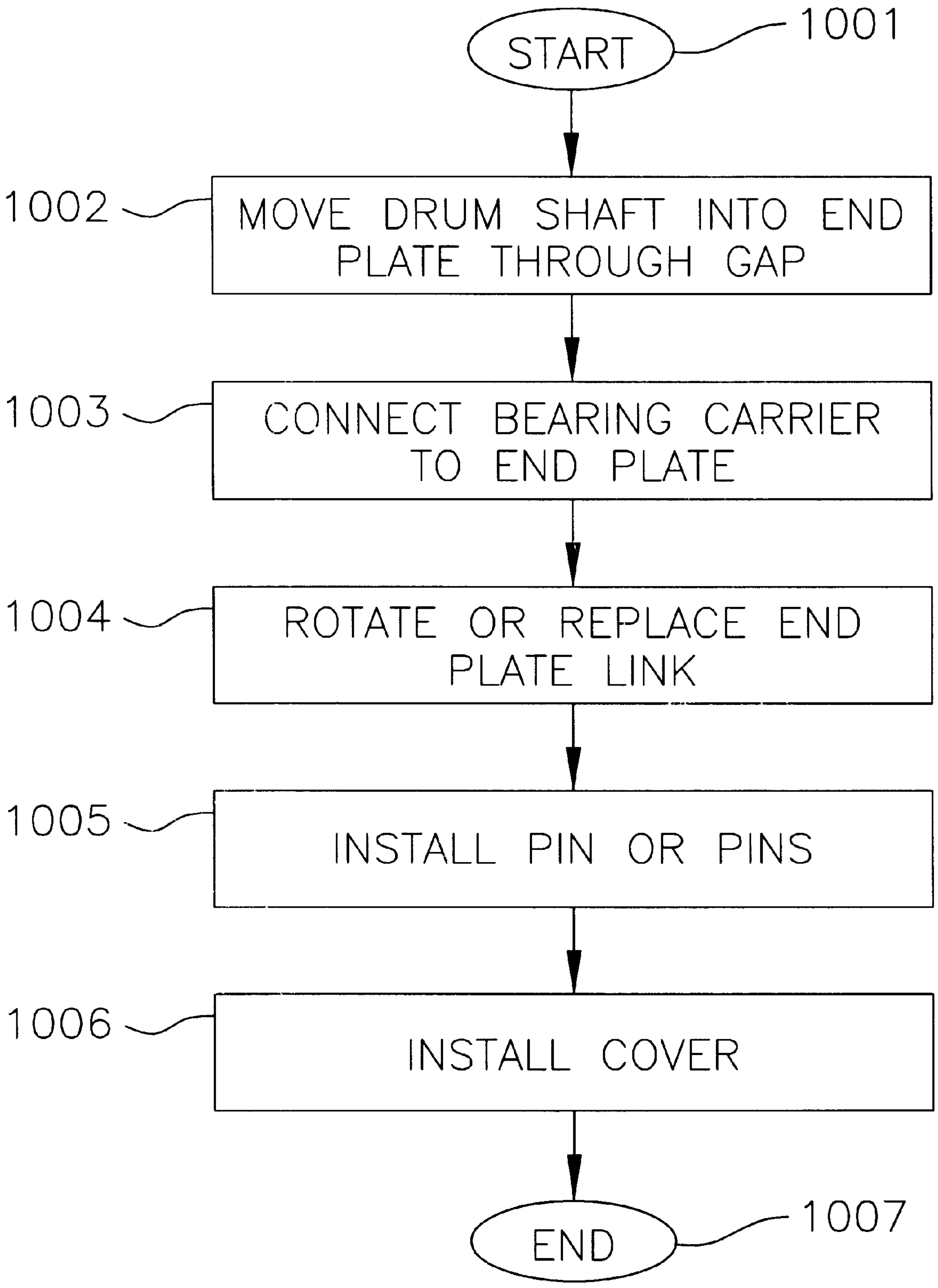
FIG. 10 is a flow diagram illustrating a process according to the invention for installing a drum shaft in an end plate.

FIG. 10 is a flow diagram illustrating a process according to the invention for installing a drum shaft in an end plate.

The process begins in step 1001. In step 1002, the drum shaft is moved into the end plate through the gap. In step 1003, the bearing carrier is connected to the end plate. This may involve bolting the bearing carrier to the end plate. Other techniques for attaching the bearing carrier to the end plate may also be used. In step 1004, the end plate link is rotated or replaced. If one of the pins is already installed in the end plate link, the end plate link; is rotated about that pin into its installed position. If none of the pins have been installed in the end plate link, the end plate link is replaced into its installed position. In step 1005, any remaining pins are installed in the end plate link. In step 1006, the cover is installed. This step includes installing any covers or panels or moving them to their final installed positions. In step 1007, the process ends.

While the above description contains many specific features of the invention, these should not be construed as limitations on the scope of the invention, but rather as one exemplary embodiment thereof. Many other variations are possible. Accordingly, the scope of the invention should be determined not by the embodiments illustrated, but by the appended claims and their legal equivalents.

What is claimed is:

1. A hoist comprising:

a hoist drum defining a drum shaft;

a line attached at a first end to the hoist drum;

a motor defining a motor shaft;

a transmission having an output shaft coupled to the drum shaft and an input shaft coupled to the motor shaft, the transmission being disposed such that a torque applied to the hoist induces a rotational force on the transmission; and a force-sensitive element coupling the transmission to a base for measuring the rotational force on the transmission.

2. The apparatus of claim 1, wherein the motor is flexibly coupled to said input shaft.

3. The apparatus of claim 1, wherein the motor is movably coupled to said base.

4. The apparatus of claim 1, wherein the force-sensitive element comprises a strain gauge.

5. The apparatus of claim 1, wherein the force-sensitive element comprises a load cell.

6. The apparatus of claim 3, wherein the motor and the transmission are coupled by means of a gear tooth coupling comprising a plurality of spherically curved gear teeth.

7. The apparatus of claim 1, wherein the force sensitive element is designed to allow movement of the transmission relative to the force sensitive element when force is applied to the transmission.

8. A method for measuring the force applied to a hoist as described in claim 1, comprising the steps of:

connecting a second end of the line to an anchor;

connecting a load on the line between the drum shaft and the anchor such that a fast line load is defined between the drum shaft and the load and a dead line load is defined between the load and the anchor;

measuring the fast line load;

measuring the dead line load; and processing the fast line load and dead line load information to determine the force applied to the load.

9. The method of claim 8, wherein the step of measuring the fast line load comprises measuring the force on the transmission.

10. The method of claim 8, further comprising providing a strain sensing element coupled between the anchor and the line to sense the force applied to the anchor.

11. The method of claim 8, wherein the step of measuring the fast line load includes the step of providing a strain gauge coupled to the transmission.

12. The method of claim 8, wherein the step of measuring the fast line load includes the step of providing a hydraulic load cell coupled to the transmission.

13. The method of claim 8, further comprising the step of measuring the distance between the center of the drum shaft and the line being wound around the drum shaft.

14. The method of claim 13, wherein the step of measuring the distance includes the step of providing at least one of the distance measuring devices selected from the group consisting of: an optical beam generator, a mechanical sensor, a proximity sensor, a magnetic sensor, and an ultrasonic transducer.

15. The method of claim 8, wherein the step of processing includes the step of determining the number of lines attached to the load, and calculating load values based on the number of lines.

16. A hoist system comprising:

a hoist drum defining a drum shaft;

a line attached at a first end to the hoist drum and at a second end to an anchor;

a load attached to the line between the hoist drum and the anchor;

a motor defining a motor shaft;

a transmission having an output shaft coupled to the drum shaft and an input shaft coupled to the motor shaft, the transmission being disposed such that a torque applied to the hoist induces a rotational force on the transmission;

means for measuring the force on the transmission;

means for measuring the load on the anchor; and means for processing the transmission force and anchor load information to determine the force being applied to the load.

17. The system of claim 16, wherein the means for measuring the force on the transmission is a force-sensitive element coupling the transmission to a base the force-sensitive element being designed to measure the force exerted by said transmission.

18. The system of claim 16, wherein the means for measuring the anchor load comprises a dead line drum about which the second end of the line is wound, and a load cell coupled to the drum and operative to sense the load on the drum.

19. The system of claim 16, wherein the motor is flexibly coupled to the input shaft.

20. The system of claim 16, wherein the motor is movably coupled to said base.

21. The system of claim 16, wherein the force-sensitive element comprises a strain gauge.

22. The system of claim 16, wherein the force-sensitive element comprises a load cell.

23. The system of claim 16, wherein the motor and the transmission are coupled by means of a gear tooth coupling comprising a plurality of spherically curved gear teeth.

24. The system of claim 16, wherein the force sensitive element is designed to allow movement of the transmission relative to the force sensitive element when force is applied to the transmission.

* * * * *